(12) United States Patent
Sohn et al.

(10) Patent No.: US 10,862,124 B2
(45) Date of Patent: Dec. 8, 2020

(54) CONDUCTING MATERIAL COMPOSITION, SLURRY COMPOSITION FOR FORMING ELECTRODE OF LITHIUM RECHARGEABLE BATTERY AND LITHIUM RECHARGEABLE BATTERY USING THE SAME

(71) Applicant: LG Chem, Ltd., Seoul (KR)

(72) Inventors: Kwon Nam Sohn, Daejeon (KR); Kil Sun Lee, Daejeon (KR); Won Jong Kwon, Daejeon (KR); Byung Hun Oh, Daejeon (KR); Su Jin Park, Daejeon (KR); In Young Kim, Daejeon (KR)

(73) Assignee: LG Chem, Ltd.

( * ) Notice: Subject to any disclaimer, the term of this patent is extended or adjusted under 35 U.S.C. 154(b) by 129 days.

(21) Appl. No.: 14/902,992

(22) PCT Filed: Jul. 31, 2014

(86) PCT No.: PCT/KR2014/007067
§ 371 (c)(1),
(2) Date: Jan. 5, 2016

(87) PCT Pub. No.: WO2015/016642
PCT Pub. Date: Feb. 5, 2015

(65) Prior Publication Data
US 2016/0190590 A1    Jun. 30, 2016

(30) Foreign Application Priority Data

Aug. 1, 2013 (KR) .................... 10-2013-0091626
Jul. 31, 2014 (KR) .................... 10-2014-0098034

(51) Int. Cl.
*H01M 4/62* (2006.01)
*H01M 10/0525* (2010.01)
(Continued)

(52) U.S. Cl.
CPC ............... *H01M 4/622* (2013.01); *C08K 5/06* (2013.01); *C08K 5/42* (2013.01); *H01B 1/24* (2013.01);
(Continued)

(58) Field of Classification Search
None
See application file for complete search history.

(56) References Cited

U.S. PATENT DOCUMENTS 6,251,290 B1 *  6/2001 Conaway .................. B03B 9/02
                                                       210/759
2006/0189822 A1 *  8/2006 Yoon ...................... B82Y 30/00
                                                       560/130

(Continued)

FOREIGN PATENT DOCUMENTS

CN    101668700 A    3/2010
CN    101919089 A    12/2010
(Continued)

OTHER PUBLICATIONS

Ge et al., "Multiwalled Carbon Nanotubes with Chemically Grafted Polyetherimides," J Am. Chem. Soc. 2005, 127, 9984-9985, published on web Jun. 22, 2005.*

(Continued)

*Primary Examiner* — Amanda J Barrow
(74) *Attorney, Agent, or Firm* — Lerner, David, Littenberg, Krumholz & Mentlik, LLP

(57) ABSTRACT

The present invention relates to a conducting material composition which is allowed to provide an electrode having a higher content of uniformly dispersed carbon nanotubes, thereby providing a lithium rechargeable batteryelectrode having more improved electrical characteristics and life characteristics, a slurry composition for forming a lithium rechargeable batteryelectrode using the same, and a lithium (Continued)

rechargeable battery. The conducting material composition includes carbon nanotube; and a dispersing agent including a plurality of polyaromatic hydrocarbon oxides, in which the dispersing agent contains the polyaromatic hydrocarbon oxides having a molecular weight of 300 to 1000 in an amount of 60% by weight or more.

14 Claims, 8 Drawing Sheets

(51) Int. Cl.

| | |
|---|---|
| H01M 4/66 | (2006.01) |
| H01B 1/24 | (2006.01) |
| H01M 4/13 | (2010.01) |
| H01M 4/04 | (2006.01) |
| H01M 4/139 | (2010.01) |
| C08K 5/06 | (2006.01) |
| C08K 5/42 | (2006.01) |
| H01M 4/36 | (2006.01) |
| H01M 4/133 | (2010.01) |
| H01M 10/052 | (2010.01) |
| H01M 4/587 | (2010.01) |
| H01M 4/485 | (2010.01) |
| B82Y 30/00 | (2011.01) |

(52) U.S. Cl.
CPC .......... *H01M 4/0404* (2013.01); *H01M 4/13* (2013.01); *H01M 4/139* (2013.01); *H01M 4/62* (2013.01); *H01M 4/625* (2013.01); *H01M 4/663* (2013.01); *H01M 10/0525* (2013.01); *B82Y 30/00* (2013.01); *C08G 2261/314* (2013.01); *C08G 2261/964* (2013.01); *H01M 4/133* (2013.01); *H01M 4/364* (2013.01); *H01M 4/366* (2013.01); *H01M 4/485* (2013.01); *H01M 4/587* (2013.01); *H01M 10/052* (2013.01); *H01M 2220/30* (2013.01)

(56) References Cited

U.S. PATENT DOCUMENTS

| | | | |
|---|---|---|---|
| 2006/0223991 A1 | 10/2006 | Zhang et al. | |
| 2009/0014691 A1 | 1/2009 | Kint et al. | |
| 2010/0137556 A1* | 6/2010 | Hamunen | C11B 13/005 |
| | | | 530/205 |
| 2010/0187485 A1 | 7/2010 | Kitano | |
| 2010/0248034 A1 | 9/2010 | Oki et al. | |
| 2012/0007028 A1 | 1/2012 | Hwang et al. | |
| 2012/0326093 A1* | 12/2012 | Landorf | B82Y 30/00 |
| | | | 252/500 |
| 2013/0062574 A1* | 3/2013 | Hsiao | C08L 23/02 |
| | | | 252/507 |
| 2013/0149604 A1* | 6/2013 | Fujiki | H01M 4/667 |
| | | | 429/211 |
| 2013/0187084 A1* | 7/2013 | Yoon | C01B 31/0273 |
| | | | 252/182.12 |
| 2013/0245352 A1* | 9/2013 | Breloff | C10G 1/045 |
| | | | 585/835 |
| 2015/0118559 A1 | 4/2015 | Ito et al. | |

FOREIGN PATENT DOCUMENTS

| | | |
|---|---|---|
| EP | 2228856 A1 | 9/2010 |
| EP | 3002313 A1 | 4/2016 |
| JP | 2004039443 A | 2/2004 |
| JP | 2007258030 A | 10/2007 |
| JP | 2009176720 A | 8/2009 |
| JP | 2011076948 A | 4/2011 |
| JP | 2012252824 A | 12/2012 |
| JP | 2013232313 A | 11/2013 |
| KR | 20060084785 A | 7/2006 |
| KR | 20070056875 A | 6/2007 |
| KR | 20070083877 A | 8/2007 |
| KR | 20070102266 A | 10/2007 |
| KR | 20080038806 A | 5/2008 |
| KR | 20090054677 A | 6/2009 |
| KR | 20100095473 A | 8/2010 |
| KR | 20100137621 A | 12/2010 |
| KR | 20110072917 A | 6/2011 |
| KR | 20110101347 A | 9/2011 |
| KR | 20110102844 A | 9/2011 |
| WO | 2007004652 A1 | 1/2007 |
| WO | 2008136347 A1 | 11/2008 |
| WO | 2012177975 A1 | 12/2012 |
| WO | 2014047219 A1 | 3/2014 |

OTHER PUBLICATIONS

Yuen et al, "Preparation and Morphological, Electrical, and Mechanical Properties of Polyimide-Grafted MWCNT/Polyimide Composite," J. Polymer Science: Part A: Polymer Chemistry, vol. 45 3349-3358, Published Jun. 15, 2007.*
Polycyclic Aromatic Hydrocarbon Structure Index, National Institute of Standards and Technology (NIST), Nist Special Publication 922, Lane C. Sander and Stephen A. Wise, Dec. 1997, accessed at https://www.nist.gov/sites/default/files/documents/mml/csd/SP-922-Polycyclic-Aromatic-Hydrocarbon-Structure-Index-2.pdf.*
Choi et al, "Single, Double, Multiwall Carbon Nanotube Properties & Applications, Aldrich Materials Science, Sigma-Aldrich Co. LLC," date unknown, accessed on the web at https://www.sigmaaldrich.com/technical-documents/articles/materials-science/single-double-multi-walled-carbon-nanotubes.html.*
Chemistry LibreTexts™, Section 6.3, "Hydrogen Bonding Interactions and Solubility," publication date unknown, accessed Jul. 18, 2019 (Year: 2019).*
"Polycyclic Aromatic Hydrocarbons" Fletcher et al.; Nomenclature of Organic Compounds; Advances in Chemistry; American Chemical Society: Washington, DC 1974, p. 29. (Year: 1974).*
Afanasov et al., "Determination of Polyaromatic Hydrocarbosn in Coal Tar Pitch," J. Analytical Chem., 2009, vol. 64, No. 4, pp. 361-365 (Year: 2009).*
International Search Report for Application No. PCT/KR2014/007067 dated Nov. 12, 2014.
Extended Search Report from European Application No. 14831291.1, dated Dec. 22, 2016.

* cited by examiner

[FIG. 1a]
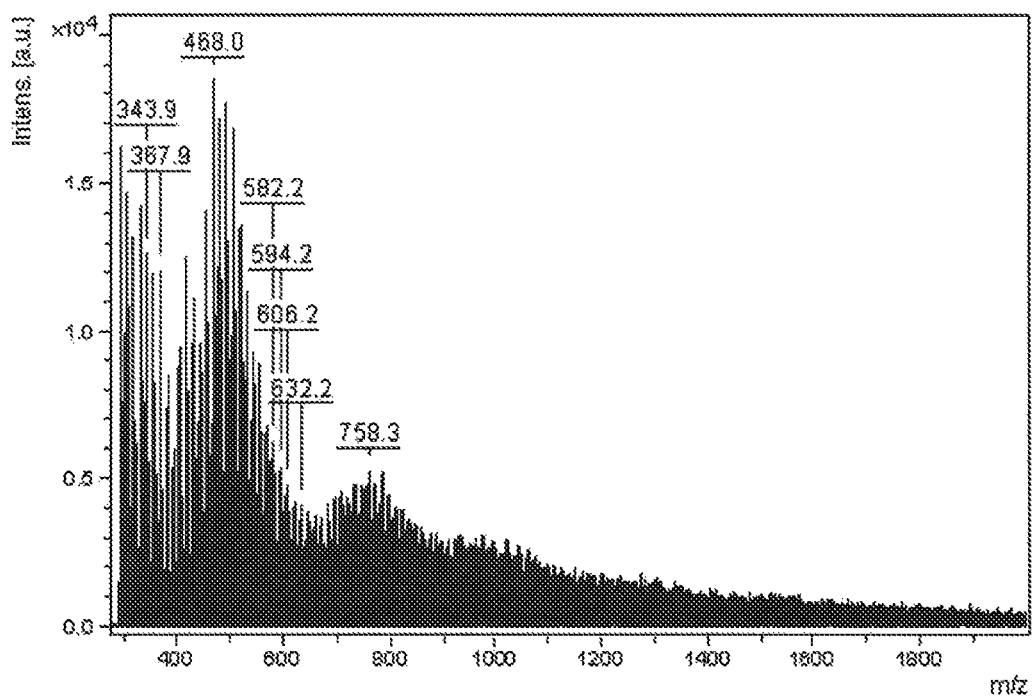
[FIG. 1b]
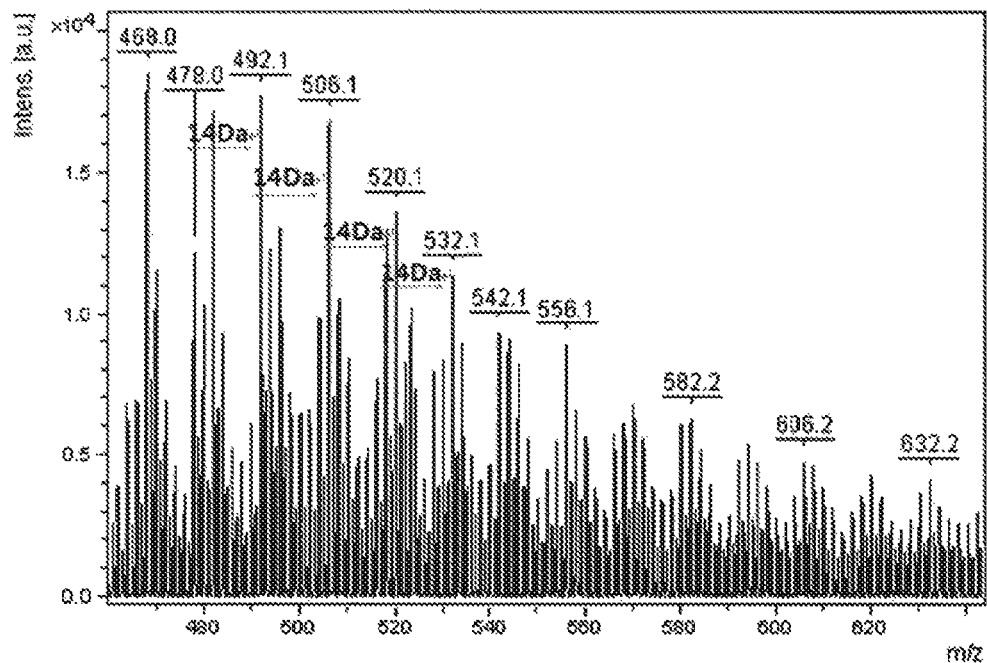

[FIG. 2a]
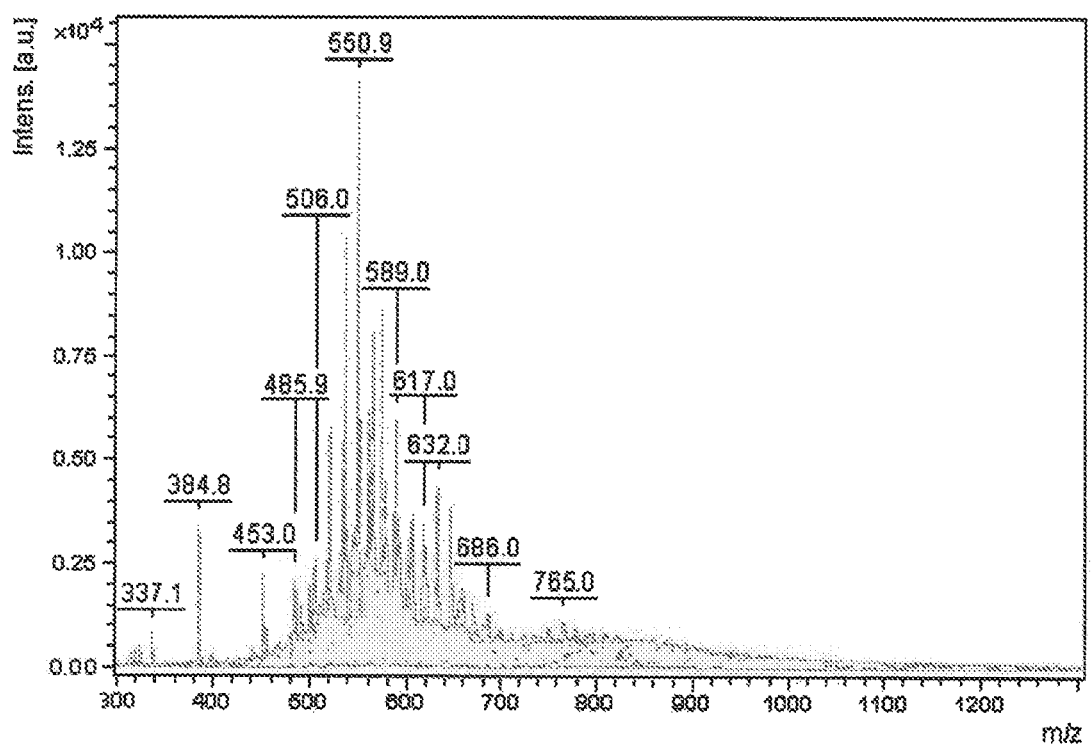
[FIG. 2b]
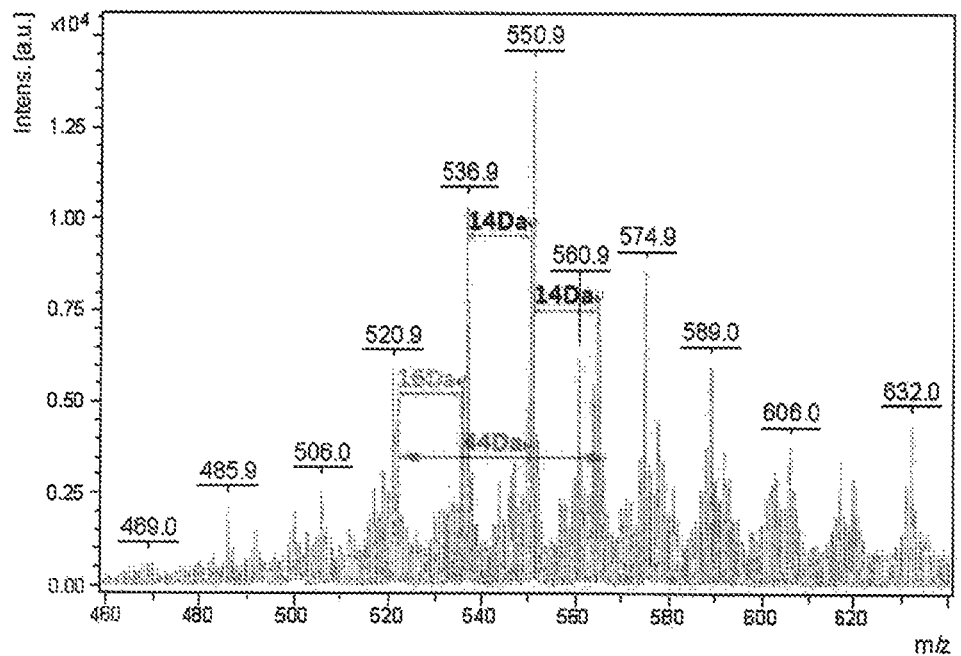

[FIG. 3]
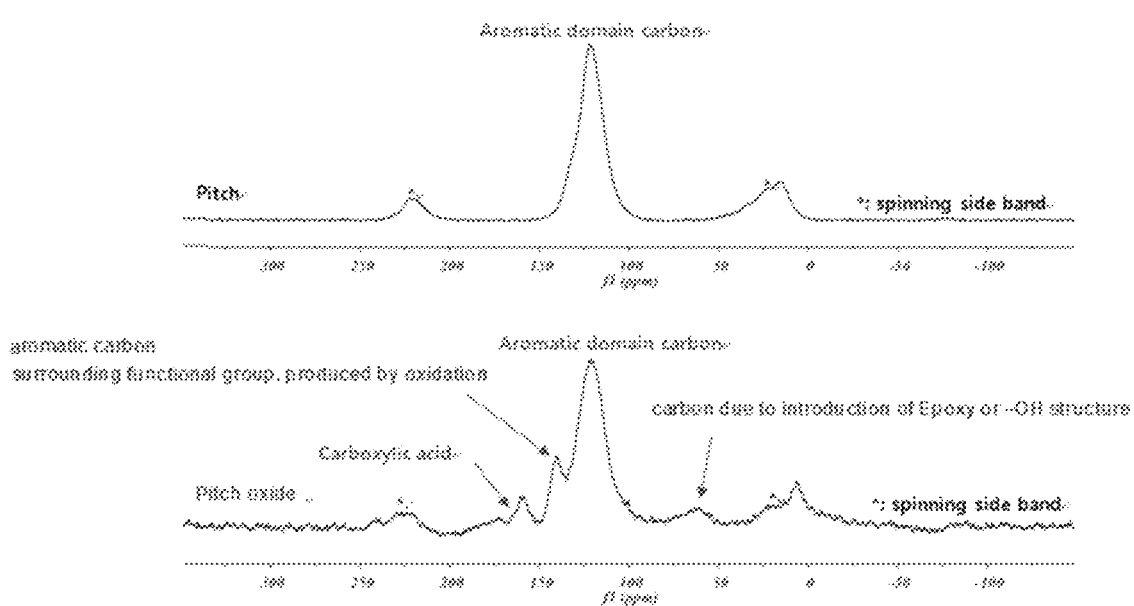

[FIG. 4]
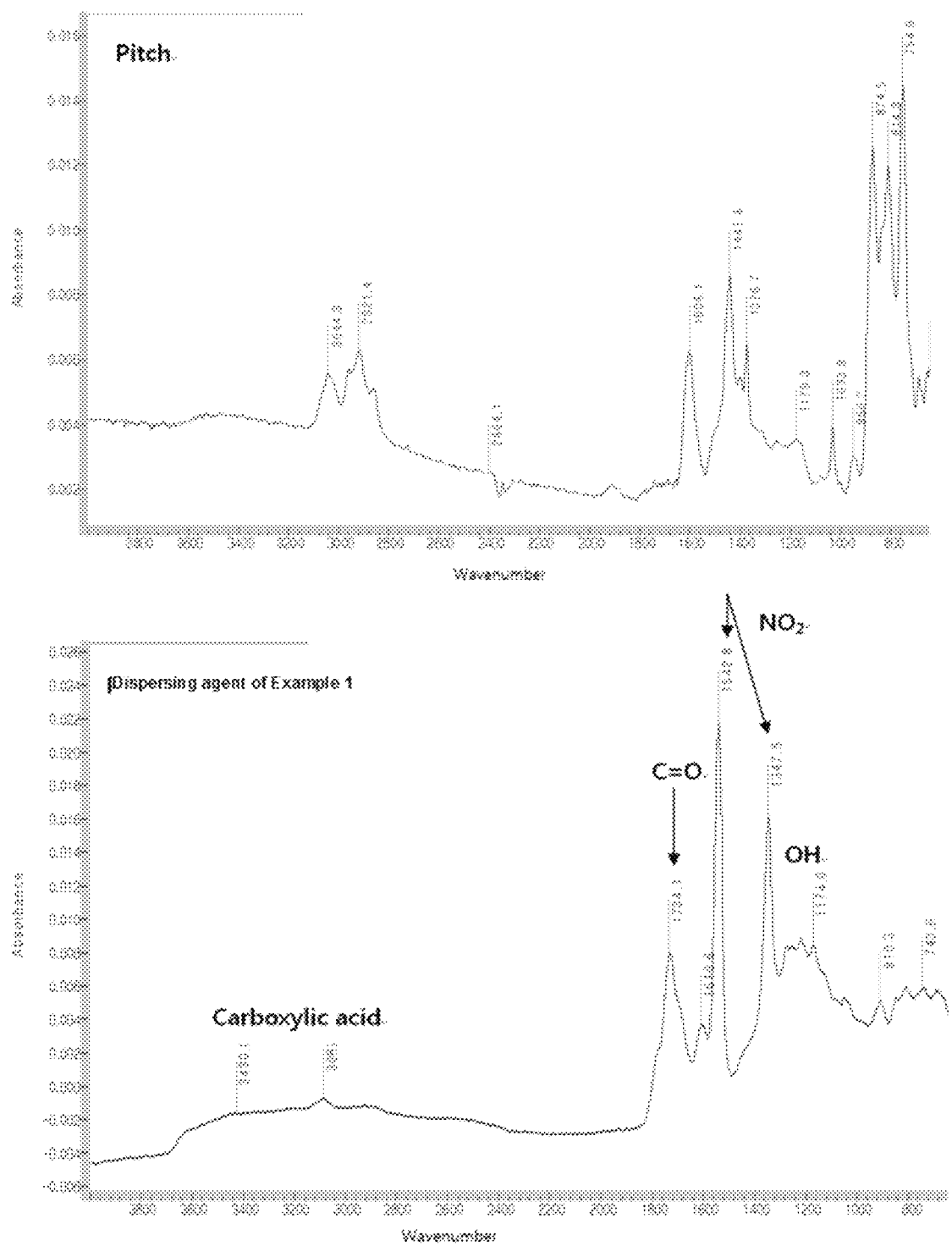

[FIG. 5]
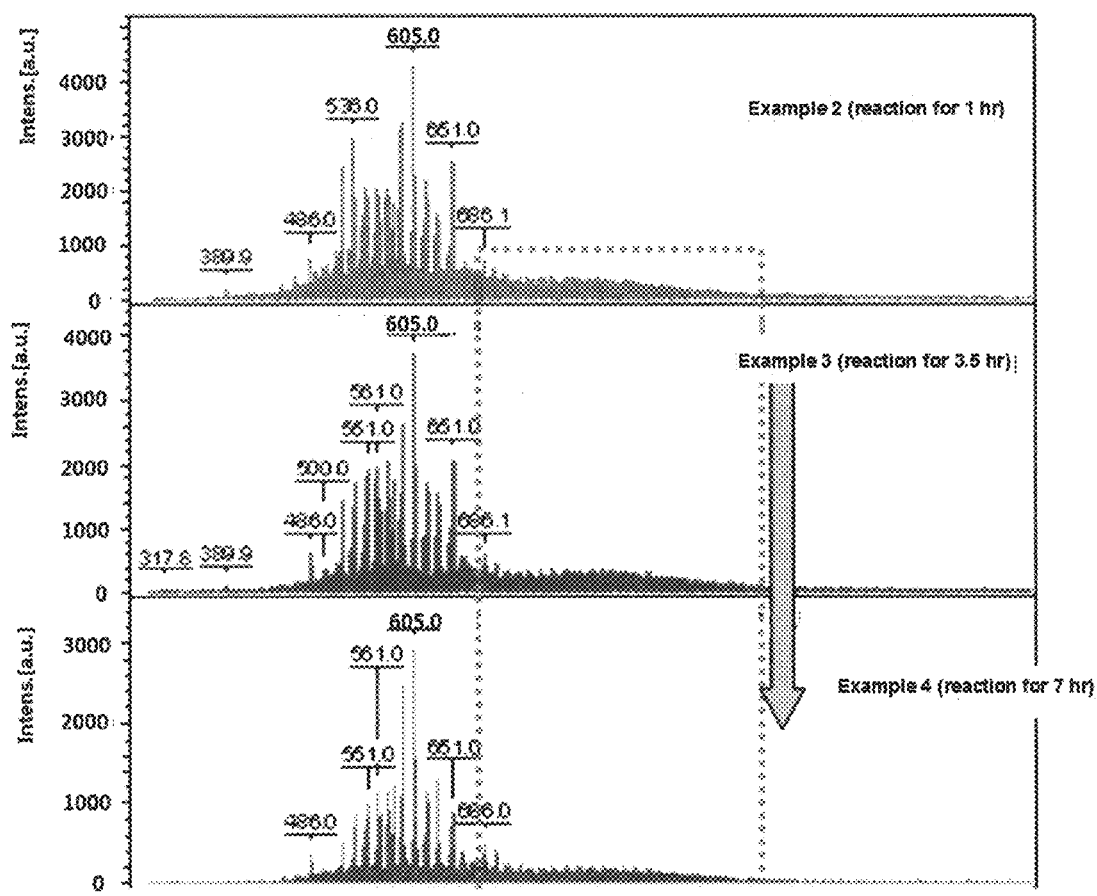

[FIG. 6a]
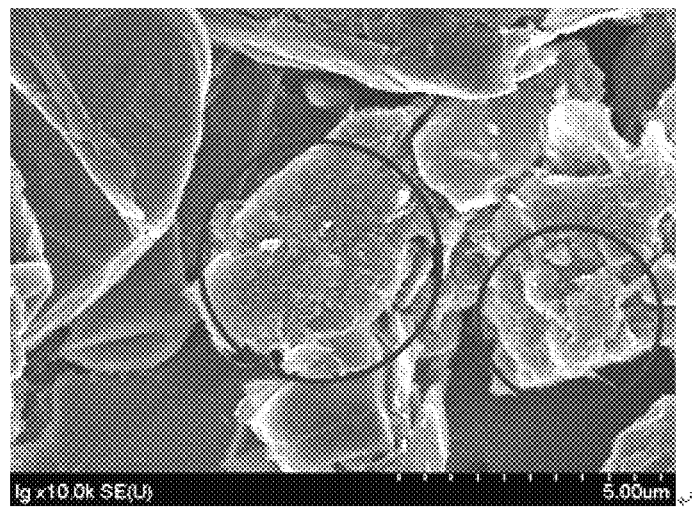
[FIG. 6b]
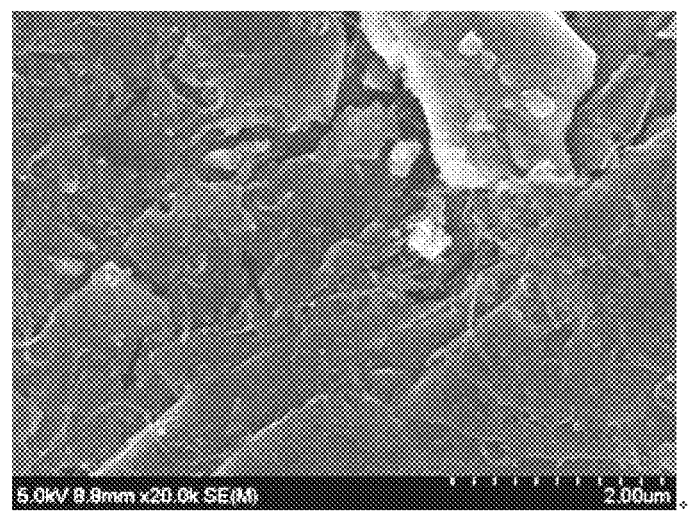

[FIG. 7a]
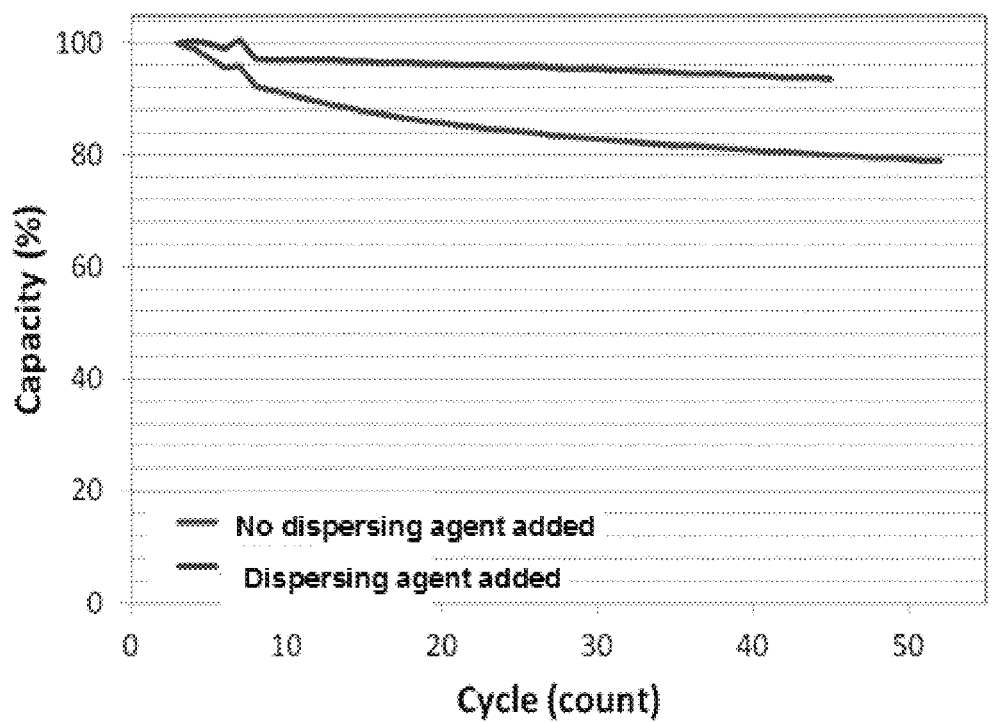

[FIG. 7b]
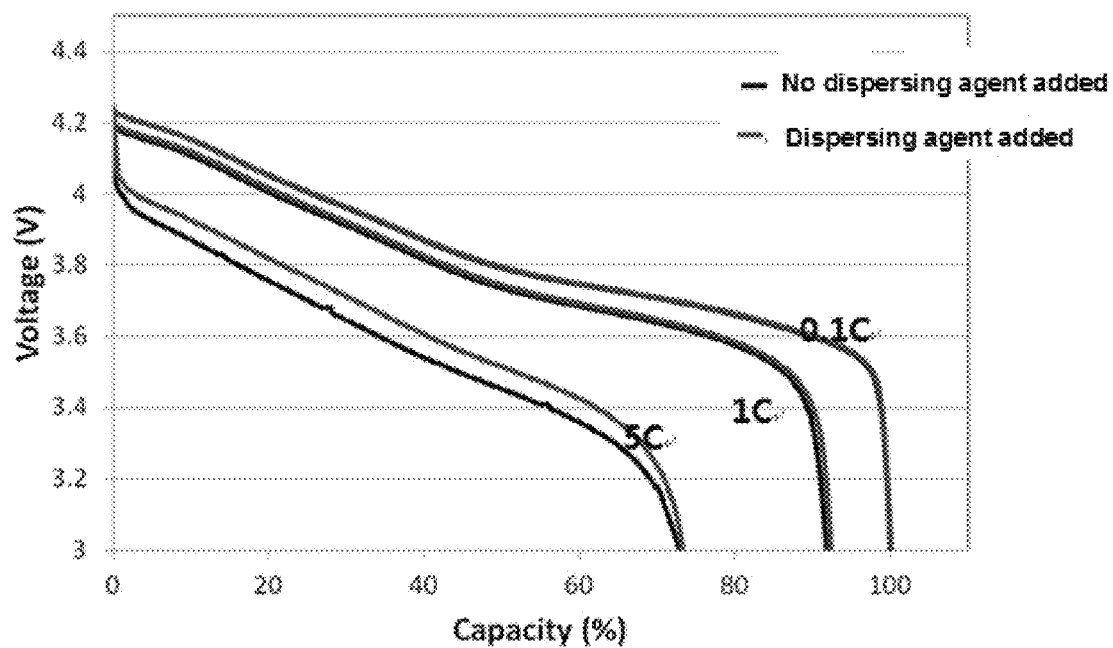

CONDUCTING MATERIAL COMPOSITION, SLURRY COMPOSITION FOR FORMING ELECTRODE OF LITHIUM RECHARGEABLE BATTERY AND LITHIUM RECHARGEABLE BATTERY USING THE SAME

CROSS-REFERENCE TO RELATED APPLICATION

This application is a national phase entry under 35 U.S.C. § 371 of International Application No. PCT/KR2014/007067, filed Jul. 31, 2014, which claims priority to Korean Application No. 10-2013-0091626, filed Aug. 1, 2013 and Korean Application No. 10-2014-0098034, filed Jul. 31, 2014, the disclosures of which are incorporated herein by reference.

TECHNICAL FIELD

The present invention relates to a conducting material composition which is allowed to provide an electrode having a higher content of uniformly dispersed carbon nanotubes, thereby providing a lithium rechargeable battery electrode having more improved electrical characteristics and life characteristics, a slurry composition for forming a lithium rechargeable battery electrode using the same, and a lithium rechargeable battery.

BACKGROUND ART

Recently, as the markets for electric vehicles, electric power storage batteries, mobile smart devices, etc. are rapidly growing, it is required to develop batteries such as lithium rechargeable batteries, etc. showing higher capacity and output characteristics than the previously known batteries.

For the development of high capacity batteries, the electrode is required to be thicker, and efficient electron transport from the thickened electrode to a current collector is required. However, zero-dimensional carbon black which has been applied as a conductive material in the conventional rechargeable batteries has a disadvantage that formation of an effective conduction path is difficult and thus the above technical demands are not satisfied. For this reason, use of carbon nanotube having a one-dimensional fiber structure has been recently considered as the conductive material.

Furthermore, for the development of the high capacity batteries, application of new materials such as silicon-based anode active materials or new lithium complex metal oxide-based cathode active materials has been widely considered and tried. However, to apply these new materials, for example, high-capacity materials such as silicon-based anode active materials, etc., it is necessary to satisfy a new technical demand of preventing cleavage of an insulator or silicon while maintaining the conductive structure during a charging and discharging process.

To satisfy this new technical demand, and furthermore, to improve electrode characteristics of the batteries, for example, electrical properties such as electrical conductivity, etc., it has been considered and tried to replace carbon black which has been conventionally applied as the conductive material of the electrode with carbon nanotube having a one-dimensional fiber structure. In particular, this carbon nanotube exhibits very excellent electrical conductivity and thermal conductivity compared to the conventional materials, and also maintains an effective conductive structure as a fiber-type conductive material, and therefore, carbon nanotube has gained great interest as a new conductive material for replacing the conventional materials.

However, this carbon nanotube has a limitation that its dispersibility is very poor when it is in the form of solid powder or in the form of slurry for manufacturing batteries, and thus it is difficult to disperse carbon nanotubes at a high concentration. In the conventional method, therefore, carbon nanotubes were uniformly dispersed using a liquid medium together with an additional dispersing agent, and then mixed with other components for electrode formation so as to prepare a slurry composition for forming an electrode and an electrode. However, it is necessary to increase the solid content in the slurry for the development of high-capacity batteries. Therefore, to produce an effective conduction path in the thickened electrode, it is required to use a large amount of carbon nanotube as a conductive material. In this case, when the conventional carbon nanotube-dispersing liquid is used, it is hard to include a higher content of carbon nanotube in the slurry composition for forming an electrode and the electrode. In fact, there has been a limitation in the improvement of characteristics of electrodes and batteries by applying carbon nanotubes. Moreover, application of the liquid media also reduces overall processability for formation of the electrodes, etc.

In order to solve these problems, there is a continuous demand to develop a technology capable of providing an electrode having a higher content of carbon nanotubes by uniformly dispersing carbon nanotubes in the form of solid such as powder, etc. at a high concentration and a battery including the electrode.

DISCLOSURE

Technical Problem

The present invention provides a conducting material composition which is allowed to provide an electrode having a higher content of uniformly dispersed carbon nanotubes, thereby providing a lithium rechargeable battery electrode having more improved electrical characteristics and life characteristics, and a slurry composition for forming a lithium rechargeable battery electrode using the same.

Further, the present invention provides a lithium rechargeable battery showing more improved characteristics by including the electrode which is formed from the slurry composition for forming an electrode.

Technical Solution

The present invention provides a conducting material composition, including carbon nanotubes; and a dispersing agent containing a plurality of polyaromatic hydrocarbon oxides, in which the dispersing agent contains the polyaromatic hydrocarbon oxides having a molecular weight of 300 to 1000 in an amount of 60% by weight or more.

The conducting material composition may include carbon nanotube powder and the dispersing agent which exists on the surface of carbon nanotube powder.

Further, in the dispersing agent included in the conducting material composition, when a plurality of polyaromatic hydrocarbon oxides are subjected to elemental analysis, the oxygen content may be 12 to 50% by weight of the total element content of the dispersing agent.

Further, in the dispersing agent, polyaromatic hydrocarbon oxide may have a structure in which one or more oxygen-containing functional groups bind to aromatic hydrocarbon containing 5 to 30, or 7 to 20 benzene rings, and the oxygen-containing functional group may include one or more selected from the group consisting of a hydroxy group, an epoxy group, a carboxyl group, a nitro group and a sulfonic group.

Meanwhile, the conducting material composition may include approximately 1 to 50 parts by weight, or approximately 5 to 30 of the dispersing agent with respect to 100 parts by weight of carbon nanotube.

Further, the conducting material composition may be used for forming a battery electrode, and more specifically, it may be included in a slurry composition for forming a lithium rechargeable battery electrode.

Meanwhile, the present invention provides a slurry composition for forming a lithium rechargeable battery electrode, including an electrode active material, the above described conducting material composition, a binder and a solvent.

In the slurry composition, the electrode active material may include a cathode active material or anode active material, the binder may include one or more selected from the group consisting of a vinylidene fluoride/hexafluoropropylene copolymer, polyvinylidene fluoride, polyacrylonitrile, polymethyl methacrylate, polyacrylate, polytetrafluoroethylene, a poly(styrene-butadiene) copolymer, alginate and polydopamine, and the solvent may include one or more selected from the group consisting of water, N-methyl pyrrolidone, acetone, tetrahydrofuran and decane.

Further, the slurry composition may include 70 to 98 parts by weight of the electrode active material, 0.1 to 15 parts by weight of the conducting material composition, and 1.0 to 20 parts by weight of the binder with respect to 100 parts by weight of the total solid content of the electrode active material, the conducting material composition, and the binder.

Further, the present invention provides a lithium rechargeable battery composed of an anode including a current collector and an anode active material layer formed on the current collector, in which the anode active material layer contains an anode active material, a conductive material and a binder; a cathode including a current collector and a cathode active material layer formed on the current collector, in which the cathode active material layer contains a cathode active material, a conductive material and a binder; and an electrolyte, in which at least one of the conductive materials contained in the anode active material layer or cathode active material layer contains the above described conducting material composition.

The lithium rechargeable battery has an electrode which is formed from the powdery conducting material composition containing a higher concentration of uniformly dispersed carbon nanotubes, and therefore, it has a higher content of carbon nanotubes uniformly dispersed in the electrode. Accordingly, the lithium rechargeable battery is able to exhibit more excellent capacity characteristics, electrical characteristics, and life characteristics by maximizing the performance improvement due to high content of carbon nanotubes.

Effect of the Invention

According to the present invention, provided is a novel dispersing agent capable of uniformly dispersing the powdery carbon nanotubes at a high concentration, and a conducting material composition including the same. It is possible to provide an electrode having a higher content of uniformly dispersed carbon nanotubes by using such powdery conducting material composition and a slurry composition for forming an electrode including the same.

Therefore, it is possible to provide a battery such as a lithium rechargeable battery, etc. showing more improved electrical characteristics, capacity characteristics and life characteristics by using the electrode. As a result, the present invention greatly contributes to achievement of high capacity characteristics in a variety of batteries such as a lithium rechargeable battery, etc.

BRIEF DESCRIPTION OF DRAWINGS

FIGS. 1a and 1b (magnifications of the molecular weight range of 400 to 500) show the molecular weight distribution of pitch, which was analyzed by MALDI-TOF mass spectrum;

FIGS. 2a and 2b (magnifications of the molecular weight range of 400 to 500) show the molecular weight distribution of the dispersing agent of Example 1, which was analyzed by MALDI-TOF mass spectrum;

FIG. 3 shows the results of 13C CPMAS NMR analysis of pitch and the dispersing agent of Example 1;

FIG. 4 shows the results of FT-IR analysis of pitch and the dispersing agent of Example 1;

FIG. 5 shows the results of comparing the molecular weight distributions of the dispersing agents of Examples 2 to 4, which were analyzed by MALDI-TOF mass spectrum;

FIGS. 6a and 6b show the SEM results of analyzing carbon nanotube distribution in the conducting material composition, which were dispersed on the surface of the active material (Graphite), when a slurry composition for forming an electrode and an electrode were formed in Example 9; and FIGS. 7a and 7b are graphs showing a comparison of electrical characteristics of the electrodes between the lithium rechargeable battery formed without using the dispersing agent and the lithium rechargeable battery of Experimental Example 2 which was formed from the conducting material composition of Example 5, the slurry composition for forming an electrode of Example 9, and the electrode (cathode or anode) by using the dispersing agent of Example 1.

DETAILED DESCRIPTION OF THE EMBODIMENTS

Hereinafter, a conducting material composition, a slurry composition for forming an electrode using the same, and a lithium rechargeable battery according to specific embodiments of the present invention will be described in more detail.

First, the "dispersing agent", as used herein, refers to any component for uniform dispersion of other components, for example, carbon nanotube, etc. in an aqueous solvent, an organic solvent, or other liquid medium.

Further, the term "conducting material composition" refers to any composition which can be used as a conductive material in a composition for forming an electrode of a battery such as a lithium rechargeable battery, etc. In this regard, regardless of the state or the specific use of the "conducting material composition" or the composition for forming an electrode, any composition can be included in the scope of the "conducting material composition", as long as it can be added as the conductive material in any composition for forming an electrode.

Further, the "polyaromatic hydrocarbon", as used herein, refers to an aromatic hydrocarbon compound, in which aromatic rings, for example, two or more, or 5 or more benzene rings bind to and are included in the structure of a single compound. Further, the "polyaromatic hydrocarbon oxide" refers to any compound, in which one or more oxygen-containing functional groups bind to its chemical structure, resulting from reaction of the above described "polyaromatic hydrocarbon" with an oxidizing agent. In this regard, the oxygen-containing functional group to be introduced into the "polyaromatic hydrocarbon" by reaction with the oxidizing agent may be any functional group having one or more oxygens therein, which is able to bind to an aromatic ring such as a hydroxy group, an epoxy group, a carboxyl group, a nitro group, a sulfonic group, etc.

Meanwhile, according to one embodiment of the present invention, provided is a conducting material composition, including carbon nanotubes; and a dispersing agent containing a plurality of polyaromatic hydrocarbon oxides, in which the dispersing agent contains the polyaromatic hydrocarbon oxides having a molecular weight of 300 to 1000 in an amount of 60% by weight or more.

The conducting material composition of one embodiment includes the dispersing agent containing a predetermined mixture of polyaromatic hydrocarbon oxides, together with carbon nanotubes. The experimental results of the present inventors showed that owing to the actions of this specific dispersing agent, the powdery carbon nanotubes can be more uniformly dispersed. As a result, it is possible to provide a conducting material composition having the powdery carbon nanotubes uniformly dispersed therein without using additional liquid media, thereby providing a slurry composition for forming an electrode or an electrode having a higher content of carbon nanotubes uniformly dispersed therein by using the conducting material composition.

It is assumed that more uniform dispersion of carbon nanotubes by the dispersing agent is attributed to the characteristics of the dispersing agent described below.

Pitch discharged as a waste during purification of fossil fuels such as petroleum, coal, etc. is a by-product used in the production of asphalt, and it may be a viscous mixture containing a plurality of polyaromatic hydrocarbons having many aromatic rings. However, the experimental results of the present inventors showed that when pitches are subjected to an oxidation process using an oxidizing agent, at least a portion of the polyaromatic hydrocarbons having excessively high molecular weight among the polyaromatic hydrocarbons contained in the pitches is degraded, and those having a very low molecular weight of 300 or less are separated by a purification process such as centrifugation, etc., and consequently, a mixture of polyaromatic hydrocarbons having a relatively narrow molecular weight distribution is obtained. Also, it was found that one or more oxygen-containing functional groups are introduced into aromatic rings of each polyaromatic hydrocarbon, thereby obtaining the mixture containing a plurality of polyaromatic hydrocarbon oxides.

In detail, when the mixture of polyaromatic hydrocarbon oxides which is obtained by the method is analyzed by MALDI-TOF MS, polyaromatic hydrocarbon oxides having a molecular weight of approximately 300 to 1000 or approximately 300 to 700 are contained in an amount of approximately 60% by weight or more, or approximately 65% by weight or more, or approximately 70 to 95% by weight. The specific kind, structure and distribution of the polyaromatic hydrocarbon oxides contained in the mixture may differ depending on the kind or origin of the pitch used as the raw material, or the kind of oxidizing agent, etc. However, the mixture of polyaromatic hydrocarbon oxides included in the dispersing agent at least contains a plurality of polyaromatic hydrocarbon oxides having a structure in which one or more oxygen-containing functional groups are introduced into polyaromatic hydrocarbon having 5 to 30, or 7 to 20 benzene rings. The polyaromatic hydrocarbon oxides in the mixture have the above described molecular weight distribution, that is, oxides having a molecular weight of approximately 300 to 1000 or approximately 300 to 700 are included in an amount of approximately 60% by weight or more, based on the total weight of the mixture.

In this regard, the kind of the oxygen-containing functional group may differ depending on the kind of the oxidizing agent which is used in the oxidation process of pitches, etc. For example, it may be one or more selected from the group consisting of a hydroxy group, an epoxy group, a carboxyl group, a nitro group and a sulfonic group. Typically, polyaromatic hydrocarbon oxides having various functional groups may be contained in the mixture.

The polyaromatic hydrocarbon oxides satisfying the above described structural properties and molecular weight distribution, and the mixture thereof may have a hydrophobic $\pi$-domain of aromatic rings and a hydrophilic region by the oxygen-containing functional groups binding to the aromatic rings at the same time. Of them, the hydrophobic $\pi$-domain participates in $\pi$-$\pi$ interaction with the surface of carbon nanotubes having carbon-carbon bonds, and the hydrophilic region creates a repulsive force between single carbon nanotubes. As a result, the dispersing agent including the mixture of the polyaromatic hydrocarbon oxides exists between powders or molecules of carbon nanotubes, so as to more uniformly disperse the carbon nanotubes. More specifically, the dispersing agent may exist on the surface of carbon nanotube powder by adsorption due to the above described $\pi$-$\pi$ interaction. Therefore, the conducting material composition of one embodiment which includes the above particular dispersing agent may include the powdery carbon nanotubes which are more uniformly dispersed therein.

Accordingly, a higher content of uniformly dispersed carbon nanotubes is included in the slurry composition for forming an electrode and the electrode by using the conducting material composition, which greatly contributes to supply of an electrode showing more improved electrical characteristics and a battery such as lithium rechargeable battery, etc. showing excellent capacity characteristics and life characteristics.

Furthermore, the dispersing agent included in the conducting material composition of one embodiment can be prepared from inexpensive raw materials such as pitch through a simplified oxidation process, and therefore, it can be easily obtained with low production costs. It is possible to provide an electrode and a battery showing excellent characteristics only by using the dispersing agent, thereby easily achieving high capacity and high efficiency of the battery.

Conventionally, a conducting material composition including fibrous carbons such as carbon nanotube and a polymer dispersing agent having a pyrene or quinacridone skeleton is known (Korean Patent Publication No. 2010-0095473). However, when such polymer dispersing agent is used alone, it is required to introduce proper functional groups into the polymer dispersing agent, depending on the kind of the medium (e.g., solvent contained in the conducting material composition, etc.) where carbon nanotubes are dispersed. Moreover, it is difficult to provide the polymer dispersing agent and the conducting material composition including the same in the form of powder, and in particular, uniform dispersion of a high concentration of carbon nanotubes is difficult when it is in the form of powder.

However, since the dispersing agent included in the conducting material composition of one embodiment is in the form of a mixture of polyaromatic hydrocarbon oxides having various molecular weights within a predetermined range and various oxygen-containing functional groups, carbon nanotubes can be uniformly dispersed in various solvents or media without introduction of additional functional groups, and a conducting material composition having a higher content of carbon nanotubes uniformly dispersed therein can be more easily prepared and provided. Furthermore, the dispersing agent included in the composition of one embodiment is able to disperse a high concentration of carbon nanotube even in the form of powder, and therefore, it can be used to easily provide an electrode and a battery having a higher content of carbon nanotube.

Meanwhile, each component of the conducting material composition of one embodiment will be described below.

In the conducting material composition of one embodiment, any type of carbon nanotubes which have been known to be conventionally used in various electrode compositions can be used as the carbon nanotube. As the carbon nanotube, for example, single wall carbon nanotubes or multi wall carbon nanotubes can be used without particular limitations, and carbon nanotubes having an aspect ratio (length/diameter) of approximately 100 to 1000 can be used. The specific surface area of the carbon nanotube may vary according to the diameter or the aspect ratio of the carbon nanotube, and the amount of the dispersing agent for uniformly dispersing carbon nanotubes in the conducting material composition can be controlled according to the specific surface area of the carbon nanotube.

Further, when a plurality of polyaromatic hydrocarbon oxides included in the dispersing agent, which is included in the conducting material composition, together with carbon nanotubes, are subjected to elemental analysis, the oxygen content in the total dispersing agent may be approximately 12 to 50% by weight or approximately 15 to 45% by weight of the total element content. This oxygen content reflects the introduction degree of oxygen-containing functional groups in the polyaromatic hydrocarbon oxides by the oxidation process. As satisfying this oxygen content, the above described hydrophilic region can be included at the appropriate degree. As a result, the carbon nanotubes can be more properly dispersed using the above described dispersing agent.

The oxygen content can be calculated by elemental analysis of a plurality of polyaromatic hydrocarbon oxides which are included in the above described mixture. That is, when the mixture sample (e.g., approximately 1 mg) is heated on, for example, a thin foil at a high temperature of approximately 900° C., the foil is suddenly melted and the temperature is increased to approximately 1500 to 1800° C. Due to the high temperature, gas is generated from the mixture sample, and gas is collected for measurement and analysis of the contents of elements. From the results of the elemental analysis, the total element content of carbon, oxygen, hydrogen, and nitrogen which are contained in a plurality of the polyaromatic hydrocarbon oxides can be measured and analyzed, and the oxygen content with respect to the total element content can be calculated.

Further, the dispersing agent included in the conducting material composition of one embodiment can be prepared by a method including the step of oxidizing the mixture including polyaromatic hydrocarbons having a molecular weight of approximately 200 to 1500 in the presence of an oxidizing agent. This preparation method will be described in more detail below.

As described above, pitch discharged as a waste during purification of fossil fuels such as petroleum, coal, etc. may be a viscous or powdery mixture containing a plurality of polyaromatic hydrocarbons. Apparently, the specific kind, structure, composition ratio, and molecular weight distribution of the polyaromatic hydrocarbon may differ depending on the raw material or origin of the pitch, etc., but the pitch may contain a plurality of polyaromatic hydrocarbons having 5 to 50 aromatic rings, for example, benzene rings in its structure, and it may generally contain polyaromatic hydrocarbons having a molecular weight of 200 to 1500. For example, the mixture (e.g., pitch) containing polyaromatic hydrocarbons having a molecular weight of 200 to 1500, which is used as a starting material in the preparation method of the dispersing agent, may include the polyaromatic hydrocarbons having a molecular weight within the above range in an amount of approximately 80% by weight or more, or approximately 90% by weight or more.

However, if the mixture containing polyaromatic hydrocarbons such as pitch is subjected to an oxidation process using an oxidizing agent, the polyaromatic hydrocarbons having an excessively high molecular weight among the polyaromatic hydrocarbons contained in the pitch are degraded, and a mixture of polyaromatic hydrocarbons having a relatively narrow molecular weight distribution can be obtained. For example, polyaromatic hydrocarbons having a molecular weight of more than approximately 1000 or approximately 700 may be degraded into those having a low molecular weight. Further, one or more oxygen-containing functional groups are introduced into aromatic rings of each polyaromatic hydrocarbon, and therefore, the mixture including a plurality of polyaromatic hydrocarbon oxides, namely, the dispersing agent of one embodiment can be very simply prepared.

In the preparation method of the dispersing agent, the kind of the oxidizing agent is not particularly limited. Any oxidizing agent can be used without limitation, as long as it is able to cause oxidation reaction of introducing oxygen-containing functional groups into aromatic hydrocarbons. Specific examples of the oxidizing agent may include nitric acid ($HNO_3$), sulfuric acid ($H_2SO_4$), hydrogen peroxide ($H_2O_2$), ammonium cerium(IV) sulfate (($NH_4$)$_4$Ce($SO_4$)$_4$), ammonium cerium(IV) nitrate (($NH_4$)$_2$Ce($NO_3$)$_6$), etc., and a mixture of two or more selected therefrom can be also used.

The oxidation step may be carried out in an aqueous solvent at a reaction temperature of approximately 10 to 90° C. for approximately 0.5 to 20 hours. In a specific embodiment, the oxidation step may be carried out by adding a predetermined amount of the mixture including the polyaromatic hydrocarbons in the presence of a liquid oxidizing agent such as sulfuric acid and/or nitric acid at room temperature, for example, at approximately 20° C. or 80° C. for approximately 1 to 12 hours. The above described properties of the dispersing agent, for example, oxidation degree of polyaromatic hydrocarbons can be properly controlled by controlling the reaction temperature or time of the oxidation step, thereby preparing a dispersing agent having the desired properties.

Further, as described above, the mixture containing polyaromatic hydrocarbons having a molecular weight of 200 to 1500, which is used as a starting material of the preparation method, may be derived from pitch obtained from fossil fuels or products thereof, and the kind, structure or molecular weight distribution of the polyaromatic hydrocarbons may differ depending on the kind of the raw material, etc. Nevertheless, the dispersing agent of one embodiment having excellent dispersibility for carbon-based materials can be simply prepared, as the mixture containing polyaromatic hydrocarbons having a molecular weight of 200 to 1500, which is derived from pitch, etc., is subjected to the oxidation process.

Meanwhile, the above described preparation method may further include the step of purifying the resultant after the oxidation step to obtain the mixture of a plurality of polyaromatic hydrocarbon oxides. Such purification step may be performed by including the step of centrifuging the resultant of the oxidation step. Owing to the purification step, the mixture of polyaromatic hydrocarbon oxides satisfying the above described molecular weight distribution, that is, the above described dispersing agent can be properly obtained with higher purity, and the dispersing agent can be used to uniformly disperse the carbon nanotubes.

Meanwhile, the conducting material composition of one embodiment which includes the above described dispersing agent, etc. may include carbon nanotube in the form of powder or particle, and the dispersing agent which exists on the surface of the carbon nanotube powder or particle. That is, the dispersing agent may exist on the surface of carbon nanotube powder by adsorption due to $\pi$-$\pi$ interaction, thereby uniformly dispersing the carbon nanotube powder via the $\pi$-$\pi$ interaction and repulsive force. Therefore, a slurry composition and an electrode can be obtained by mixing the powdery conducting material composition where carbon nanotubes are uniformly dispersed, with other components of the slurry composition for forming an electrode described below, without using additional liquid media. Accordingly, a slurry composition for forming an electrode and the electrode having a higher content of carbon nanotubes uniformed dispersed therein can be prepared with more improved processability.

Further, the conducting material composition of one embodiment may include approximately 5 to 30 parts by weight, or approximately 10 to 20 parts by weight, or approximately 15 to 30 parts by weight of the dispersing agent with respect to 100 parts by weight of carbon nanotube. Carbon nanotubes having various surface areas can be uniformly dispersed according to the content range of the dispersing agent.

The above described conducting material composition of one embodiment can be used for forming electrodes of various batteries, for example, it is included in an electrode slurry composition of a lithium rechargeable battery to be used for forming an electrode such as a cathode or anode of the lithium rechargeable battery.

According to another embodiment of the present invention, provided is a slurry composition for forming a lithium rechargeable battery electrode, including the above described conducting material composition. Such slurry composition may include an electrode active material, the above described conducting material composition of one embodiment, a binder and a solvent.

Such slurry composition for forming an electrode can be prepared by mixing the above described powdery conducting material composition with other components such as an active material, a binder, a solvent, etc. In particular, since the slurry composition is obtained by using the conducting material composition where carbon nanotube powder itself is uniformly dispersed, it includes the carbon nanotube conductive materials uniformly dispersed at a high concentration, and therefore, an electrode having a high content of uniformly dispersed carbon nanotubes can be obtained.

However, the slurry composition of another embodiment can be prepared according to a typical composition and preparation method of a slurry composition for forming a lithium rechargeable battery electrode, except that the conducting material composition of one embodiment is used.

For example, the slurry composition may include an electrode active material of a cathode active material or an anode active material. As the cathode active material, metal oxide, lithium complex metal oxide, lithium complex metal sulfide, lithium complex metal nitride, etc. which is capable of intercalating/deintercalating lithium may be used. Further, as the anode active material, any lithium metals or lithium alloys, or carbon-based or silicon-based materials which have been known to be used as the anode active material of lithium rechargeable batteries, such as lithium metal or lithium alloy; coke, artificial graphite, natural graphite, a combusted organic polymer compound, carbon fiber, Si, $SiO_x$, Sn or $SnO_2$, may be used without particular limitations.

Further, as the binder, a resin containing one or more selected from the group consisting of a vinylidene fluoride/hexafluoropropylene copolymer, polyvinylidene fluoride, polyacrylonitrile, polymethyl methacrylate, polyacrylate, polytetrafluoroethylene, a poly(styrene-butadiene) copolymer, alginate and polydopamine, or mixtures thereof may be used.

Further, as the solvent, one or more solvents selected from the group consisting of water, N-methyl pyrrolidone, acetone, tetrahydrofuran and decane, or a solvent mixture of two or more thereof may be used.

Meanwhile, the above described slurry composition of another embodiment may include approximately 70 to 98 parts by weight of the electrode active material, approximately 0.1 to 15 parts by weight of the conducting material composition, and approximately 1.0 to 20 parts by weight of the binder with respect to 100 parts by weight of the total solid content of the electrode active material, the conducting material composition, and the binder, except the solvent. As the slurry composition includes the above described conducting material composition, the conductive material containing carbon nanotubes can be included at a high content as much as approximately 10 parts by weight, with respect to the total solid content. The carbon nanotubes can maintain their uniformly dispersed state at a high concentration in the slurry composition. Therefore, the slurry composition can be used to prepare an electrode and a battery which have a high content of uniformly dispersed carbon nanotubes and show more excellent electrical characteristics, etc.

Meanwhile, according to still another embodiment, provided is a lithium rechargeable battery which is obtained by using the above described conducting material composition and slurry composition for forming an electrode. This lithium rechargeable battery is composed of an anode including a current collector and an anode active material layer formed on the current collector, in which the anode active material layer contains an anode active material, a conductive material and a binder; a cathode including a current collector and a cathode active material layer formed on the current collector, in which the cathode active material layer contains a cathode active material, a conductive material and a binder; and an electrolyte, in which at least one of the conductive materials contained in the anode active material layer or cathode active material layer contains the above described conducting material composition.

This lithium rechargeable battery may have a higher content of carbon nanotubes which are uniformly dispersed as the conductive material in the electrode. Therefore, electrical characteristics of the electrode itself can be further improved. Further, it is possible to provide a battery, such as a lithium rechargeable battery, showing improved electrical characteristics, capacity characteristics and life characteristics by maximizing the advantage of using carbon nanotube as the conductive material. As a result, the present invention greatly contributes to achievement of high capacity characteristics in a variety of batteries such as a lithium rechargeable battery, etc.

Meanwhile, the lithium rechargeable battery can be prepared according to a constitution of the typical lithium rechargeable battery, except that the conducting material composition of one embodiment is used as the conductive material, and therefore, an additional description thereof will be omitted.

Hereinafter, actions and effects of the present invention will be described in more detail with reference to specific Examples of the present invention. However, these Examples are for illustrative purposes only, and the scope of the present invention is not intended to be limited by these Examples.

EXAMPLE 1

Preparation of Dispersing Agent

Pitch which is a petroleum by-product obtained from POSCO was subjected to the following oxidation and purification processes to prepare a dispersing agent of Example 1.

First, 0.5 to 1.5 g of pitch was added to 75 ml of a solution mixture of sulfuric acid/nitric acid (a volume ratio of 3:1) and oxidation reaction was performed at 70° C. for approximately 3.5 hours.

Thereafter, the pitch reaction solution resulting from the oxidation reaction was cooled to room temperature, and diluted with approximately 5 volumes of distilled water, followed by centrifugation at approximately 3500 rpm for 30 minutes. Subsequently, the supernatant was discarded, and the same amount of distilled water was added and re-suspended, followed by centrifugation under the same conditions. Finally, the pellet was recovered and dried. Consequently, the dispersing agent of Example 1 was prepared.

First, the molecular weight distribution of the pitch which was used as a raw material during the preparation process of the dispersing agent was analyzed by MALDI-TOF mass spectrum, and the results are shown in FIGS. 1a and 1b (magnifications of the molecular weight range of 400 to 500), and the molecular weight distribution of the dispersing agent of Example 1 was also analyzed in the same manner, and the results are shown in FIGS. 2a and 2b (magnifications of the molecular weight range of 400 to 500). This analysis was performed using a MALDI-TOF mass spectrum spectrometer (Ultraflex II, Bruker), after the pitch or dispersing agent was added to a matrix and they were mixed and dried.

Referring to FIGS. 1a and 1b (magnification), it was found that the pitch contained polyaromatic hydrocarbons having a molecular weight of 200 to 1500. Particularly, in the magnification of FIG. 1b, high peaks were detected at an interval of a molecular weight of 14 Da, indicating that a plurality of polyaromatic hydrocarbons having different numbers of aromatic rings (benzene rings) were linked by aliphatic hydrocarbons. In contrast, referring to FIGS. 2a and 2b (magnification), high peaks were detected at intervals of 44 Da and 16 D in polyaromatic hydrocarbons of the dispersing agent of Example 1, indicating that it exists in the form of a mixture of 3 or more polyaromatic hydrocarbon oxides each having a distinct molecular weight in which oxygen-containing functional groups such as —COOH or —OH are introduced into aromatic hydrocarbons. A group of oxides having a molecular weight of approximately 300 to 1000 or approximately 300 to 700 was found to be included in an amount of 60% by weight or more with at least 2 of the 3 or more polyaromatic hydrocarbon oxides falling within this group.

Further, the pitch (upper) used as a raw material and the dispersing agent of Example 1 (lower) were analyzed by 13C CPMAS NMR (Varian 400MHz Solid-State NMR), respectively. The analysis results are compared and shown in FIG. 3. Referring to FIG. 3, peaks derived from carbons of aromatic hydrocarbons and some peaks derived from carbons of aliphatic hydrocarbons were detected, but no oxygen-containing functional groups were detected in the pitch. In contrast, the NMR analysis results of the dispersing agent of Example 1 show the peaks of oxygen-containing functional groups. The kind of the oxygen-containing functional groups was found to be an epoxy group, a hydroxy group or a carboxyl group.

Additionally, the pitch used as a raw material and the dispersing agent of Example 1 were analyzed in the powder form by FT-IR (Agilent 660-IR), and the analysis results are compared and shown in FIG. 4. FIG. 4 also shows appearance of the peaks of oxygen-containing functional groups in the dispersing agent of Example 1.

EXAMPLES 2 to 4

Preparation of Dispersing Agent

Pitch which is a petroleum by-product obtained from POSCO (however, this pitch was different from the sample used in Example 1) was used, and dispersing agents of Examples 2 to 4 were prepared in the same manner as in Example 1, except that the oxidation reaction was performed for 1 hour (Example 2), 3.5 hours (Example 3) or 7 hours (Example 4), respectively.

These dispersing agents were analyzed by MALDI-TOF mass spectrum in the same manner as in Example 1, and the results are compared and shown in FIG. 5. Referring to FIG. 5, as the oxidation time was increased, the content of the components (polyaromatic hydrocarbon oxides) having a molecular weight of more than approximately 1000 or approximately 700 in the dispersing agent was decreased, and as a result, dispersing agents were obtained in the form of a mixture including the polyaromatic hydrocarbon oxides having a molecular weight of approximately 300 to 1000 or approximately 300 to 700 at a higher content.

EXPERIMENTAL EXAMPLE 1

Measurement of Oxygen Content of Dispersing Agent

Each 1 mg of the dispersing agent samples obtained in Examples 3 and 4 was heated on a thin foil at a high temperature of approximately 900° C. At this time, while the foil was suddenly melted, the temperature was increased to approximately 1500 to 1800° C., and gas was generated from the sample due to the high temperature. This gas was collected and subjected to elemental analysis to measure and analyze the contents of carbon, oxygen, hydrogen and nitrogen. The analysis results are compared with those of the pitch used in the preparation of each dispersing agent, and shown in the following Table 1.

TABLE 1

| Sample | C(wt %) | H(wt %) | N(wt %) | O(wt %) |
|---|---|---|---|---|
| Pitch | 95.5 | 4.5 | — | — |
| Example 3 | 40.0 | 1.8 | 7.6 | 38.0 |
| Example 4 | 40.0 | 1.5 | 7.8 | 39.2 |

Referring to Table 1, when the content of each element in the dispersing agents of Examples 3 and 4 was analyzed, the oxygen content was approximately 12 to 50% by weight or approximately 30 to 40% by weight with respect to the total element content.

EXAMPLES 5 to 8

Preparation of Conducting Material Compositions

Each 3.0 g of the dispersing agents of Examples 1 to 4 was added to 3 L of a solvent selected from polar organic solvents such as distilled water, ethanol, acetone, THF, NMP, etc., and resuspended by sonication, and 10.0 g of carbon nanotube was added to each dispersing agent solution, followed by sonication for further 1 hour. Subsequently, the carbon nanotube solutions were centrifuged at 8000 rpm, and the dispersing agent-carbon nanotube pellets were recovered and dried to prepare powdery carbon nanotube conducting material compositions.

EXAMPLES 9 to 12

Preparation of Electrodes and Lithium Rechargeable Batteries

Graphite and carbon-coated SiO were used as an anode active material, SBR (styrene-butadiene rubber) was used as a binder, CMC (carboxymethyl cellulose) was used as a thickener, and the conducting material compositions of Examples 5 to 8 were used, and they were mixed at a weight ratio of graphite:SiO:SBR:CMC:conducting material composition of 90:5:2:2:1 to prepare a slurry composition for forming an electrode. One side of the copper current collector was coated with this slurry composition at a thickness of 65 um, dried, and pressed, and punched to a desired size to prepare an anode. This anode was used to prepare each lithium rechargeable battery including a cathode and the anode by a typical method.

In the slurry composition of example 9 using the conducting material composition of Example 5, distribution of carbon nanotubes in the conducting material composition, which were dispersed on the surface of the active material (Graphite), was examined and analyzed by SEM, and the results are shown in FIGS. 6a and 6b, respectively. Referring to FIGS. 6a and 6b, it was found that high content of carbon nanotubes were included in the more uniformly dispersed state.

EXPERIMENTAL EXAMPLE 2

Test of Characteristics of Lithium Rechargeable Battery

The life characteristics and high efficiency characteristics of the lithium rechargeable battery prepared in Example 9 were tested. Also, an electrode and a lithium rechargeable battery of Comparative Example were prepared using powdery carbon nanotubes, instead of the conducting material composition of Example 5, and they were tested in the same manner, and the results are shown in FIGS. 7a and 7b.

Referring to FIGS. 7a and 7b, it was found that the lithium rechargeable battery prepared in Example showed more excellent life characteristics and high efficiency characteristics.

The invention claimed is:

1. A conducting material composition, comprising carbon nanotubes; and
a dispersing agent comprising 3 or more polyaromatic hydrocarbon oxides each having a distinct molecular weight, comprising a subset of polyaromatic hydrocarbon oxides having a molecular weight of 300 to 1000 which are present in an amount of 70%-95% by weight based on the total weight of the 3 or more polyaromatic hydrocarbon oxides, wherein at least 2 of the 3 or more polyaromatic hydrocarbon oxides fall within the subset of polyaromatic hydrocarbon oxides having a molecular weight of 300 to 1000,
wherein each of the 3 or more polyaromatic hydrocarbon oxides has a structure in which one or more oxygen-containing functional groups bind to an aromatic hydrocarbon containing 7 to 20 benzene rings in its structure, and
wherein the dispersing agent is prepared by:
oxidizing a pitch using an oxidation agent, and
subsequently purifying the product of the oxidation by centrifugation,
wherein the pitch comprises polyaromatic hydrocarbons having a molecular weight of 200 to 1500 in an amount of 80% by weight or more, and the oxidizing is carried out in an aqueous solvent at a reaction temperature of 10 to 90° C. for 0.5 to 20 hours.

2. The conducting material composition of claim 1 in the form of a powder, comprising a carbon nanotube powder and the dispersing agent which exists on a surface of the carbon nanotube powder.

3. The conducting material composition of claim 1, wherein an oxygen content is 12 to 50% by weight of a total element content of the dispersing agent, when the dispersing agent including the 3 or more polyaromatic hydrocarbon oxides is subjected to elemental analysis.

4. The conducting material composition of claim 1, wherein the one or more oxygen-containing functional groups include one or more selected from the group consisting of a hydroxy group, an epoxy group, a carboxyl group, a nitro group and a sulfonic group.

5. The conducting material composition of claim 1, comprising 1 to 50 parts by weight of the dispersing agent with respect to 100 parts by weight of the carbon nanotubes.

6. The conducting material composition of claim 1, which is part of a component of a battery electrode.

7. The conducting material composition of claim 6, which is included in an electrode slurry composition of a lithium rechargeable battery.

8. A slurry composition for forming a lithium rechargeable battery electrode, comprising an electrode active material, the conducting material composition of claim 1, a binder and a solvent.

9. The slurry composition for forming a lithium rechargeable battery electrode of claim 8, wherein the electrode active material includes a cathode active material or an anode active material.

10. The slurry composition for forming a lithium rechargeable battery electrode of claim 8, wherein the binder includes one or more selected from the group consisting of a vinylidene fluoride/hexafluoropropylene copolymer, polyvinylidene fluoride, polyacrylonitrile, polymethyl methacrylate, polyacrylate, polytetrafluoroethylene, a poly(styrene-butadiene) copolymer, alginate and polydopamine.

11. The slurry composition for forming a lithium rechargeable battery electrode of claim 8, wherein the solvent includes one or more selected from the group consisting of water, N-methyl pyrrolidone, acetone, tetrahydrofuran and decane.

12. The slurry composition for forming a lithium rechargeable battery electrode of claim 8, comprising 70 to 98 parts by weight of the electrode active material, 0.1 to 15 parts by weight of the conducting material composition, and 1.0 to 20 parts by weight of the binder with respect to 100 parts by weight of the total solid content of the electrode active material, the conducting material composition, and the binder.

13. A lithium secondary battery, comprising an anode including a current collector and an anode active material layer formed on the current collector, in which the anode active material layer contains an anode active material, a conductive material and a binder;

a cathode including a current collector and a cathode active material layer formed on the current collector, in which the cathode active material layer contains a cathode active material, a conductive material and a binder; and an electrolyte, wherein at least one of the conductive materials contained in the anode active material layer or cathode active material layer contains the conducting material composition of claim 1.

14. A battery electrode comprising the conducting material composition of claim 1.

* * * * *